US006985859B2

(12) United States Patent  (10) Patent No.: US 6,985,859 B2
Morin  (45) Date of Patent: Jan. 10, 2006

(54) ROBUST WORD-SPOTTING SYSTEM USING AN INTELLIGIBILITY CRITERION FOR RELIABLE KEYWORD DETECTION UNDER ADVERSE AND UNKNOWN NOISY ENVIRONMENTS

(75) Inventor: Philippe R. Morin, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 663 days.

(21) Appl. No.: 09/818,849

(22) Filed: Mar. 28, 2001

(65) Prior Publication Data

US 2002/0161581 A1   Oct. 31, 2002

(51) Int. Cl.
*G10L 15/00* (2006.01)

(52) U.S. Cl. .................. 704/240; 704/254; 704/252; 704/255

(58) Field of Classification Search ................ 704/234, 704/240, 251, 253, 270.1, 254, 233, 241, 704/242, 252, 255
See application file for complete search history.

(56) References Cited

U.S. PATENT DOCUMENTS

| | | | |
|---|---|---|---|
| 5,425,129 A | | 6/1995 | Garman et al. |
| 5,465,317 A | * | 11/1995 | Epstein ..................... 704/236 |
| 5,604,839 A | * | 2/1997 | Acero et al. ............... 704/234 |
| 5,710,864 A | | 1/1998 | Juang et al. |
| 5,719,921 A | | 2/1998 | Vysotsky et al. |
| 5,761,639 A | * | 6/1998 | Takebayashi et al. ....... 704/253 |
| 5,832,063 A | | 11/1998 | Vysotsky et al. |
| 6,029,124 A | * | 2/2000 | Gillick et al. ............... 704/200 |
| 6,029,130 A | | 2/2000 | Aroyoshi |
| 6,032,114 A | * | 2/2000 | Chan .......................... 704/226 |
| 6,138,094 A | * | 10/2000 | Miet et al. .................. 704/233 |
| 6,138,095 A | * | 10/2000 | Gupta et al. ................ 704/234 |
| 6,505,156 B1 | * | 1/2003 | Junkawitsch et al. ....... 704/256 |
| 6,526,380 B1 | * | 2/2003 | Thelen et al. ............... 704/251 |
| 6,539,353 B1 | * | 3/2003 | Jiang et al. ................. 704/254 |
| 6,571,210 B2 | * | 5/2003 | Hon et al. ................... 704/251 |
| 2001/0018654 A1 | * | 8/2001 | Hon et al. ................... 704/257 |

FOREIGN PATENT DOCUMENTS

EP  0 694 906 A1  1/1996

(Continued)

OTHER PUBLICATIONS

Rose, R. and Paul, D.; "A Hidden Markov Model Based Keyword Recognition System;" 1990 IEEE ICASSP Proceedings, pp. 129-132.

(Continued)

*Primary Examiner*—Susan McFadden
*Assistant Examiner*—Huyen X. Vo
(74) *Attorney, Agent, or Firm*—Harness, Dickey & Pierce, PLC

(57) ABSTRACT

A method and system for spotting words in a speech signal having adverse and unknown noisy environments is provided. The method removes the dynamic bias introduced by the environment (i.e., noise and channel effect) that is specific to each word of the lexicon. The method includes the step of generating a first recognition score based on the speech signal and a lexicon entry for a word. The recognition score tracks an absolute likelihood that the word is in the speech signal. A background score is estimated based on the first recognition score. The method further provides for calculating a confidence score based on a matching ratio between a minimum recognition value and the background score. The method and system can be implemented for any number of words, depending upon the application. The confidence scores therefore track noise-corrected likelihoods that the words are in the speech signal.

13 Claims, 5 Drawing Sheets

FOREIGN PATENT DOCUMENTS

| | | |
|---|---|---|
| EP | 1 020 847 A2 | 7/2000 |
| EP | 1020847 A2 * | 7/2000 |
| GB | 1 020 847 A2 * | 1/1999 |

OTHER PUBLICATIONS

Article entitled "Confidence Measure and Incremental Adaptation for the Rejection of Incorrect Data", by N. Moreau, D. Charlet and D. Jouvet; 2000 IEEE International Conference on Acoustics, Speech and Signal Processing, Jun. 5-9, 2000, vol. 3., pp. 1807-1810, ISBN 0-7803-6293-4.

Article entitled "A New Decoder Based on a Generalized Confidence Score", by Myoung-Wan Koo, Chin-Hui Lee and Biing-Hwang Juang, 1998 IEEE International Conference on Acoustics, Speech and Signal Processing, 1998 vol. 1, pp. 213-216, ISBN 0-7803-4428-Jun. 1998.

* cited by examiner

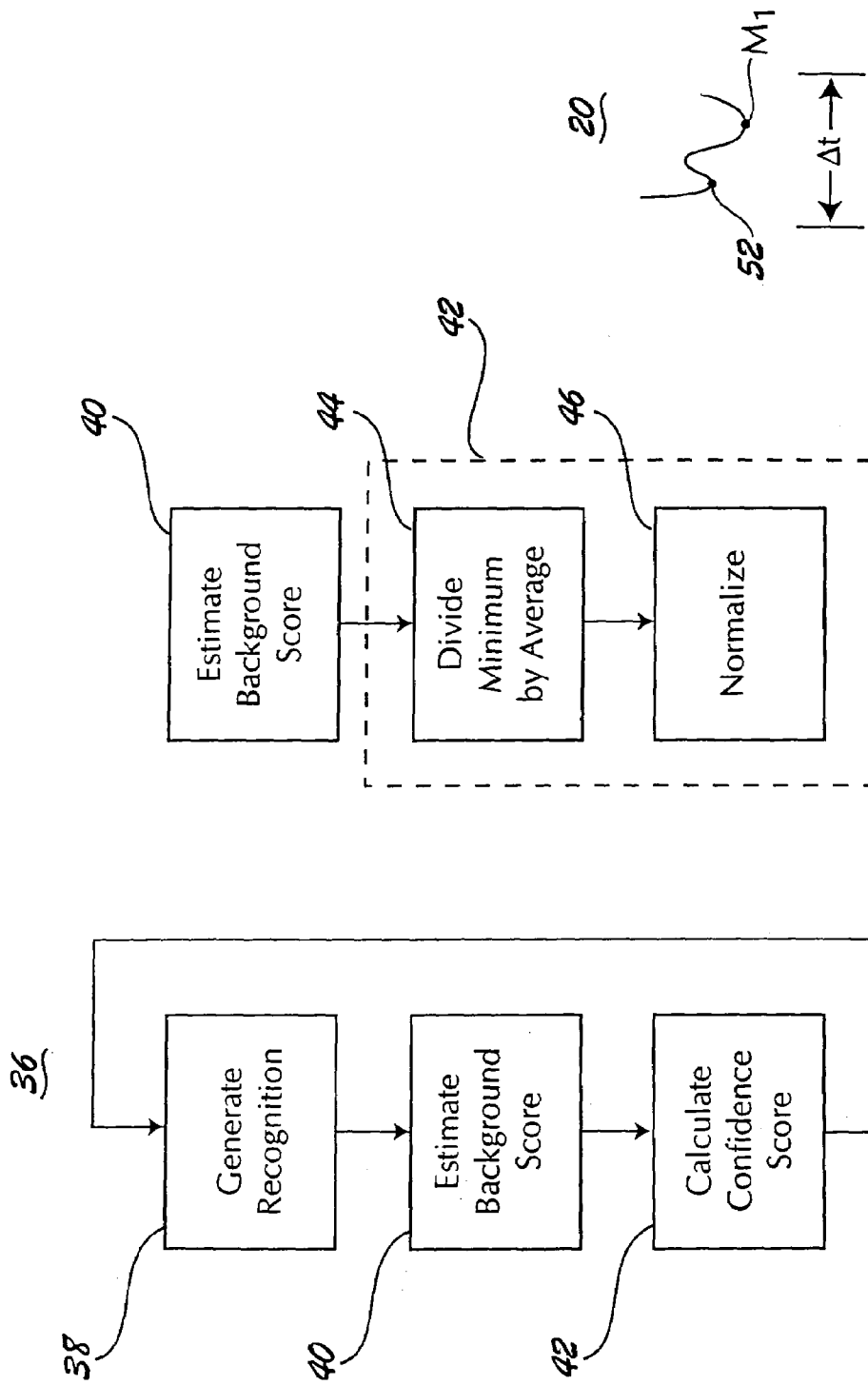

ROBUST WORD-SPOTTING SYSTEM USING AN INTELLIGIBILITY CRITERION FOR RELIABLE KEYWORD DETECTION UNDER ADVERSE AND UNKNOWN NOISY ENVIRONMENTS

BACKGROUND OF THE INVENTION

1. Technical Field

The present invention relates generally to speech recognition. More particularly, the present invention relates to a method and system for spotting words in a speech signal that is able to dynamically compensate for background noise and channel effect.

2. Discussion

Speech recognition is rapidly growing in popularity and has proven to be quite useful in a number of applications. For example, home appliances and electronics, cellular telephones, and other mobile consumer electronics are all areas in which speech recognition has blossomed. With this increase in attention, however, certain limitations in conventional speech recognition techniques have become apparent.

One particular limitation relates to end point detection. End point detection involves the automatic segmentation of a speech signal into speech and non-speech segments. After segmentation, some form of pattern matching is typically conducted in order to provide a recognition result. A particular concern, however, relates to background (or additive) noise and channel (or convolutional) noise. For example, it is well documented that certain applications involve relatively predictable background noise (e.g., car navigation), whereas other applications involve highly unpredictable background noise (e.g., cellular telephones). While the above end point detection approach is often acceptable for low noise or predictable noise environments, noisy or unpredictable backgrounds are difficult to handle for a number of reasons. One reason is that the ability to distinguish between speech and non-speech deteriorates as the signal-to-noise ratio (SNR) diminishes. Furthermore, subsequent pattern matching becomes more difficult due to distortions (i.e., spectral masking effect) introduced by unexpected background noise.

With regard to channel noise, it is known that the channel effect can be different depending upon the signal transmission/conversion devices used. For example, an audio signal is very likely to be altered differently by a personal computer (PC) microphone versus a telephone channel. It is also known that the noise type, noise level, and channel all define an environment. Thus, unpredictable channel noise can cause many of the background noise problems discussed above. Simply put, automatic segmentation in terms of speech and non-speech rapidly becomes unreliable when dealing with unpredictable channels, medium to high noise levels or non-stationary backgrounds. Under those conditions, automatic end point detectors can make mistakes, such as triggering on a portion without speech or adding a noise segment at the beginning and/or end of the speech portion.

Another concern with regard to traditional endpoint detection is the predictability of the behavior of the end-user (or speaker). For example, it may be desirable to recognize the command "cancel" in the phrase "cancel that", or recognize the command "yes" in the phrase "uh . . . yes". Such irrelevant words and hesitations can cause significant difficulties in the recognition process. Furthermore, by alternatively forcing the user to follow a rigid speaking style, the naturalness and desirability of a system is greatly reduced. The endpoint detection approach is therefore generally unable to ignore irrelevant words and hesitations uttered by the speaker.

Although a technique commonly known as word spotting has evolved to address the above user predictability concerns, all conventional word spotting techniques still have their shortcomings with regard to compensating for background noise. For example, some systems require one or several background models, and use a competition scheme between the word models and the background models to assist with the triggering decision. This approach is described in U.S. Pat. No. 5,425,129 to Garman et al., incorporated herein by reference. Other systems, such as that described in U.S. Pat. No. 6,029,130 to Ariyoshi, incorporated herein by reference, combines word spotting with end point detection to help locate the interesting portion of the speech signal. Others use non-keyword or garbage models to deal with background noise. Yet another approach includes discriminative training where the scores of other words are used to help increase the detection confidence, as described in U.S. Pat. No. 5,710,864 to Juange et al., incorporated herein by reference.

All of the above word spotting techniques are based on the assumption that the word matching score (representing an absolute likelihood that the word is in the speech signal) is the deciding recognition factor regardless of the background environment. Thus, the word with the best score is considered as being detected as long as the corresponding score exceeds a given threshold value. Although the above assumption generally holds in the case of high SNR, it fails in the case of low SNR where the intelligibility of a word can be greatly impacted by the spectral characteristics of the noise. The reduction in intelligibility is due to the noise masking effect that can either hide or de-emphasize some of the relevant information characterizing a word. The effect varies from one word to another, which makes the score comparison between words quite difficult and unreliable. It is therefore desirable to provide a method and system for spotting words in a speech signal that dynamically compensates for channel noise and background noise on a per-word basis.

The above and other objectives are provided by a method for spotting words in a speech signal in accordance with the present invention. The method includes the step of generating a first recognition score based on the speech signal and a lexicon entry for a first word. The first recognition score tracks an absolute likelihood that the first word is in the speech signal. A first background score is estimated based on the first recognition score. In the preferred embodiment, the first background score is defined by an average value for the first recognition score. The method further provides for calculating a first confidence score based on a matching ratio between a first minimum recognition value and the first background score. The first confidence score therefore tracks a noise-corrected likelihood that the first word is in the speech signal. The above process can be implemented for any number of words (i.e., a second, third and fourth word, etc.). Thus, the present invention acknowledges that the relationship between recognition scores of words is noise-type and noise-level dependent. As such, the present invention provides a level of reliability that is unachievable through conventional approaches.

Further in accordance with the present invention, a method for calculating a word spotting confidence score for a given word is provided. The method provides for dividing a minimum value of a speech recognition score by an average value of the speech recognition score over a predetermined period of time such that a matching ratio results. The average value defines an estimated background score. The method further provides for normalizing the matching ratio, where the normalized matching ratio defines the confidence score.

In another aspect of the invention, a word spotting system includes a speech recognizer and a spotting module. The speech recognizer generates recognition scores based on a speech signal and lexicon entries for a plurality of words. The recognition scores track absolute likelihoods that the words are in the speech signal. The spotting module estimates background scores based on the recognition scores. The spotting module further calculates confidence scores on a frame-by-frame basis based on matching ratios between minimum recognition scores and the background scores. The confidence scores therefore track noise-corrected likelihoods that the words are in the speech signal.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and sub-joined claims and by referencing the following drawings, in which:

FIG. 4 is a flowchart of a method for spotting words in a speech signal in accordance with the principles of the present invention;

FIG. 5 is a flowchart of a process for calculating a word spotting confidence score in accordance with one embodiment of the present invention; and FIG. 6 is an enlarged view of a local minimum of a recognition score in accordance with one embodiment of the present invention.

DETAILED DESCRIPTION OF THE PREFERRED EMBODIMENTS

Figure 1:
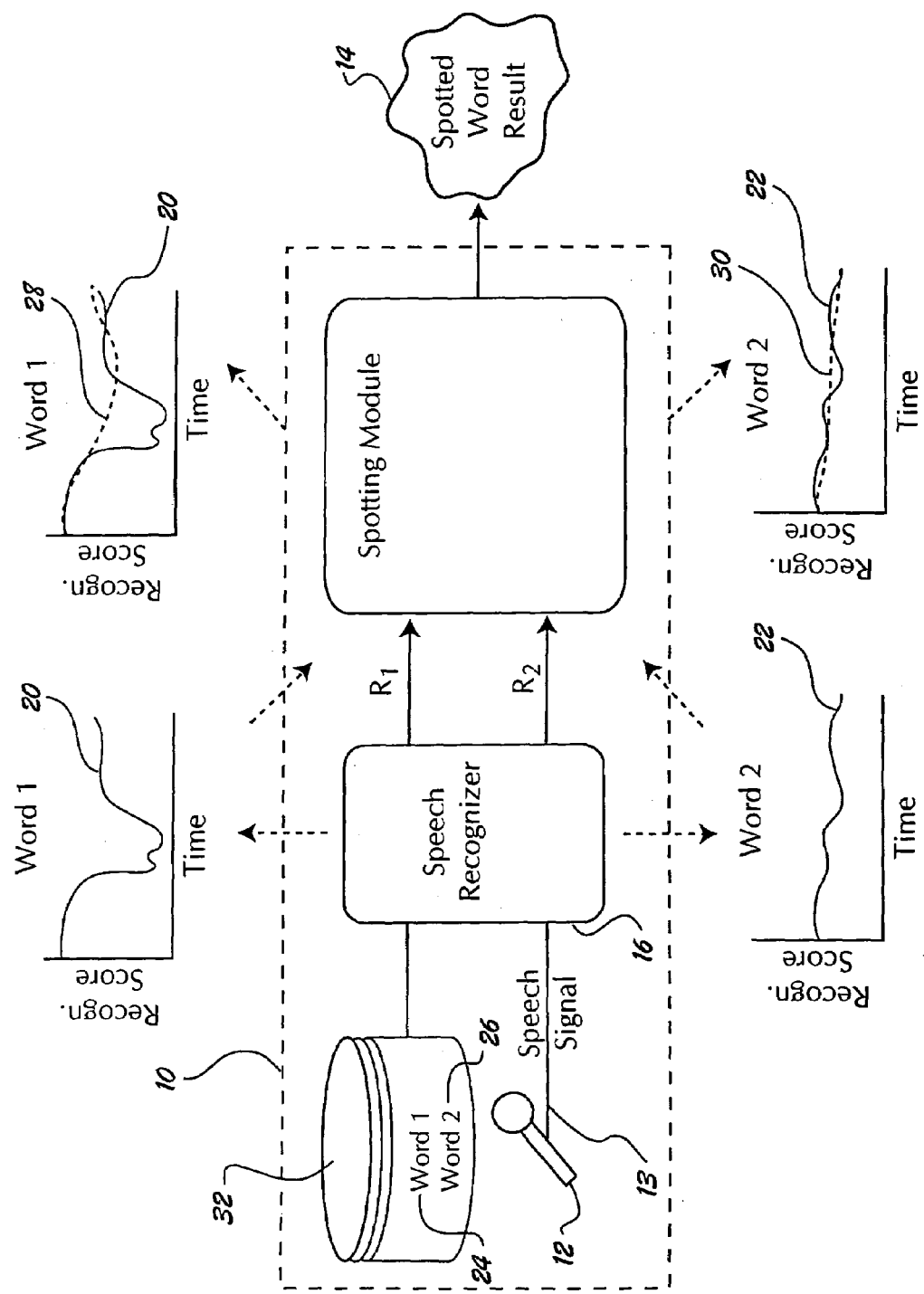
FIG. 1 is a block diagram of a word spotting system in accordance with the principles of the present invention.

Turning now to FIG. 1, a word spotting system 10 is shown. It will be appreciated that generally the word spotting system 10 accepts a speech signal 13 from an input device such as microphone 12, and generates a spotted word result 14. The system 10 can be implemented in any number of devices in which word spotting is useful. For example, a cellular telephone might use the system 10 to implement a voice dialing system (not shown). Thus, in one embodiment, the speech signal 13 represents a continuous stream of speech from a telephone user (not shown), wherein the spotting system 10 looks for particular words in the speech in order to execute a dialing process. The spotted word result 14 is passed on to the remainder of the voice dialing system for execution of various commands. It is important to note, however, that although the spotting system 10 can be used in a widely varying number of applications, the spotting system 10 is uniquely suited for environments with severe and unpredictable background and channel noise.

Generally, the spotting system 10 has a speech recognizer 16 and a spotting module 18. The recognizer 16 generates recognition scores 20,22 ($R_1$ and $R_2$) based on the speech signal 13 and lexicon entries for a plurality of words 24,26. It can be seen that the spotting module 18 estimates background scores 28,30 based on the recognition scores 20,22. A background score for a given word W is the score obtained when forcing the matching of the word model for W with the background environment (i.e., when W is not spoken). The spotting module 18 also calculates confidence scores (described in greater detail below) on a frame-by-frame basis based on matching ratios between minimum recognition values and the background scores 28,30. As will be discussed in greater detail below, the confidence scores track noise-corrected likelihoods that the words 24,26 are in the speech signal 13.

It is important to note that the spotting system 10 has been simplified for the purposes of discussion. For example, the illustrated lexicon 32 has two entries, whereas it is envisioned that the application may require many more. It is also important to note that the spotting system 10 can be configured to search the speech signal 13 for a single word, if desired.

Figure 2A:
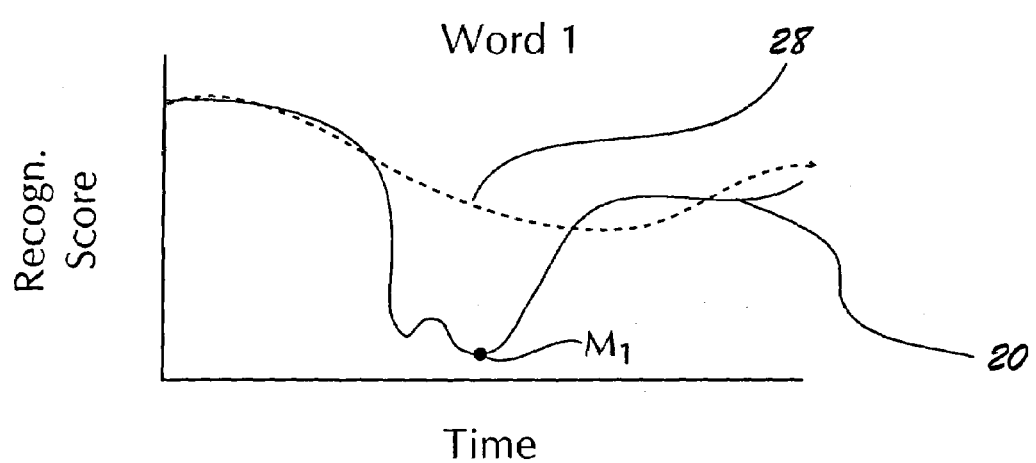
FIG. 2A is an enlarged view of the plot of the first recognition score and first background score shown in FIG. 1.
Figure 2B:
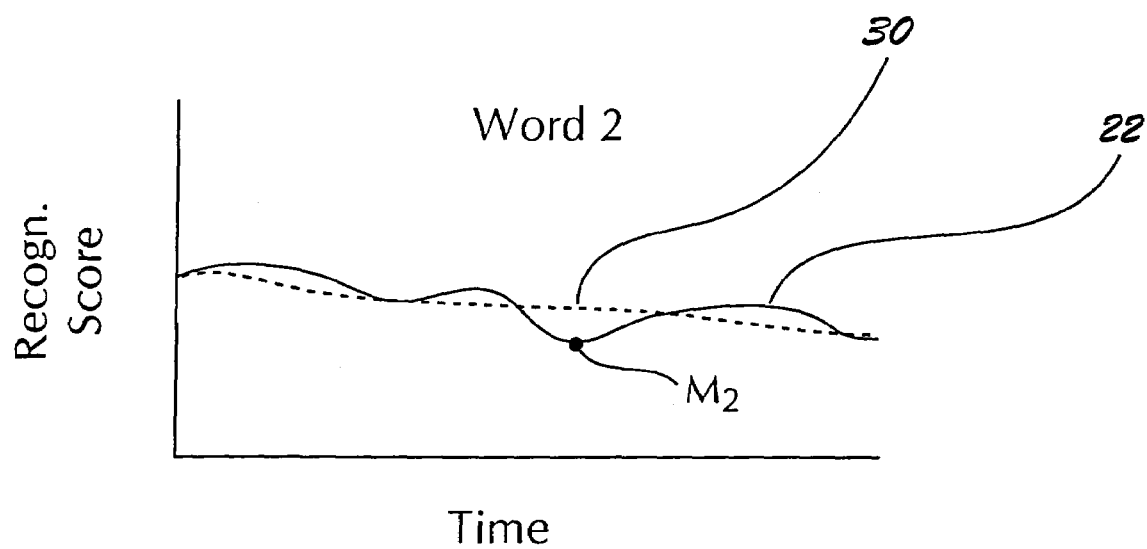
FIG. 2B is an enlarged view of the plot of the second recognition score and the second background score shown in FIG. 1.

Nevertheless, the speech recognizer 16 generates continuous recognition scores $R_1$ and $R_2$ based on the speech signal 13 and the lexicon entries. As shown in FIGS. 2A and 2B, it is preferred that the recognition scores 20,22 represent an intelligibility criterion such that a low recognition score indicates a high likelihood that the word in question is contained within the speech signal. Thus, minimum values $M_1$ and $M_2$ represent points in time wherein the recognizer is most confident that the corresponding word is in the speech signal. Any number of well known recognizers can be configured to provide this result. One such recognizer is described in U.S. Pat. No. 6,073,095 to Dharanipragada et al., incorporated herein by reference. It is important to note that the recognition scores 20,22 track absolute likelihoods that the words are in the speech signal.

Figure 3:
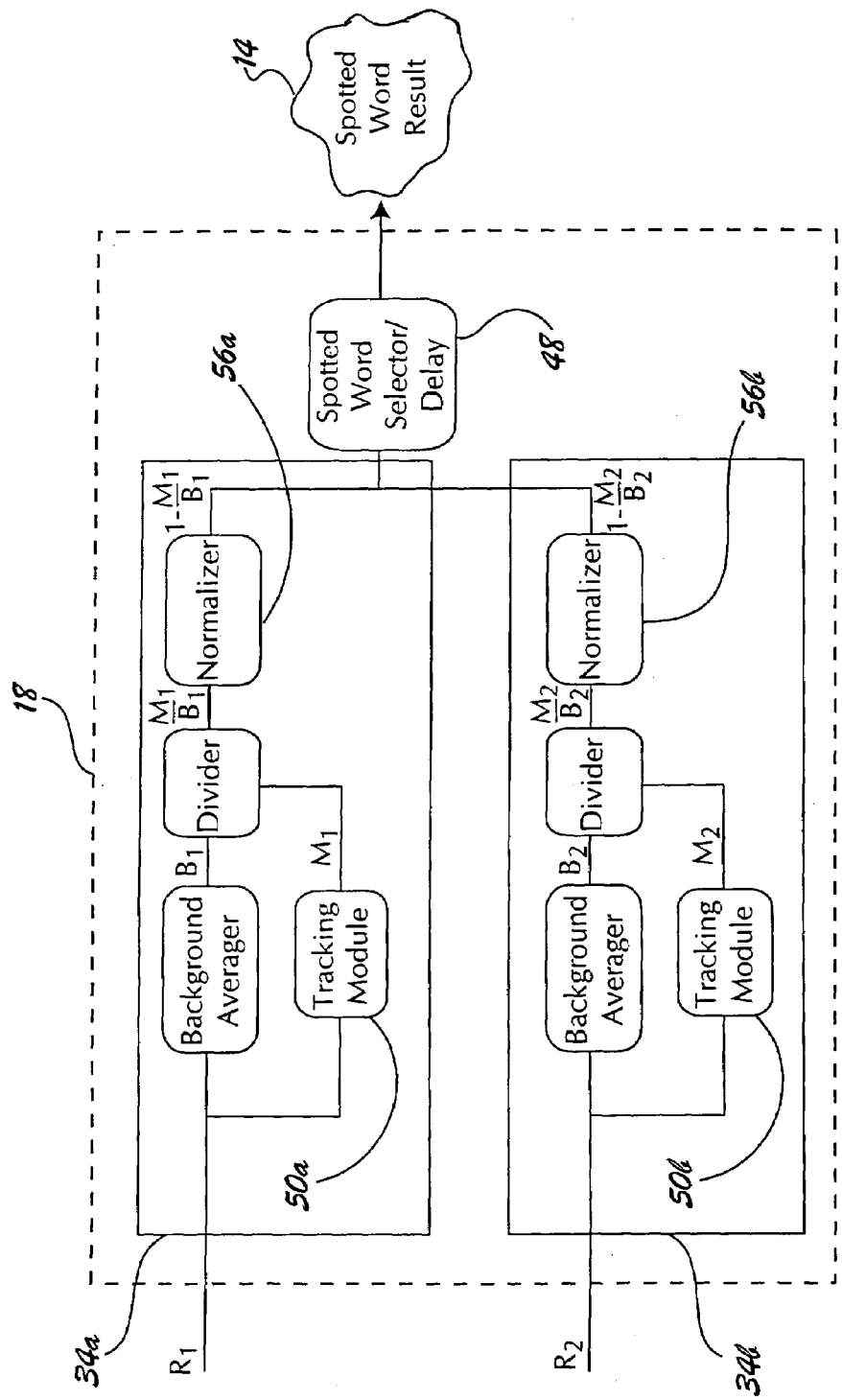
FIG. 3 is a detailed view of a spotting module in accordance with one embodiment of the present invention.

With continuing reference to FIGS. 1–3, it can be seen that the spotting module 18 enables the spotting system 10 to remove the dynamic bias specific to each word of the lexicon and thereby allow for a fair score comparison. Generally, the spotting module 18 continuously estimates the background score of each word. The triggering strategy is then based on a matching ratio between the active score and the background score at each time frame and on a per-word basis.

Thus, as best seen in FIG. 3, the spotting module 18 has a first confidence module 34a corresponding to the first word, and a second confidence module 34b corresponding to the second word. It can be seen that the confidence modules 34 have tracking modules 50 for locating minimum values M within the recognition scores R.

Thus, returning to FIG. 3, it can be seen that the confidence modules 34 divide the minimum recognition values M by average values B for the recognition scores such that the matching ratios $$\frac{M}{B}$$

result. The average values B therefore define the background scores. Each confidence module 34 also normalizes the matching ratios such that the normalized matching ratios $$1 - \frac{M}{B}$$

define the confidence scores. It will be appreciated that as the minimum value M becomes smaller than the background score B, the matching ratio $$\frac{M}{B}$$

will approach zero. The normalized matching ratio (i.e., confidence $$1 - \frac{M}{B}$$

will therefore approach one. Furthermore, since each background score B is unique to a given word, the confidence scores of the present invention take into account the fact that noise affects different words in different ways.

It will further be appreciated that a spotted word selector 48 is able to compare the confidence scores to a predetermined confidence threshold, wherein the word in question is defined as being contained within the speech signal when the corresponding confidence score exceeds the predetermined confidence threshold. It will also be appreciated that the spotted word selector 48 can also determine whether the first word and the second word correspond to a common time period within the speech signal. Thus, the selector 48 can select between the first word and the second word based on the first confidence score and the second confidence score when the first word and the second word correspond to the common time period. It will further be appreciated that the selector 48 works with likelihood values. For example, when a better likelihood value is generated by the normalizers 56, a timer (not shown) is started. That timer may be restarted if a new, better likelihood is generated before it expires (i.e., before Δt delay). When 1) the timer expires, and 2) the best likelihood value is above the likelihood threshold, then the word is detected.

With specific regard to FIG. 6, it can be seen that a delay component of the spotted word selector 48 can delay word selection for a predetermined range Δt of the recognition score 20 such that a local minimum 52 is excluded from the matching ratio calculation. The purpose of the delay is to make sure that the system does not output a word based on the first confidence exceeding the threshold value. In order to trigger, the best confidence must exceed the threshold and no better values (for any words in the lexicon) must be found within Δt seconds after that. Pragmatically, this feature prevents a premature triggering. For instance, if the phrase to spot is "Victoria Station", the delay avoids occasional triggering on "Victoria Sta". The Δt value therefore represents a validation delay triggering on local minima, and provides a mechanism for assuring that the best minimum has been reached.

FIG. 4 illustrates a method 36 for spotting words in a speech signal. As already discussed, the method 36 can be implemented for any number of words stored in the lexicon. It can be seen that at step 38 a first recognition score is generated based on the speech signal and a lexicon entry for a first word. As already noted, the recognition score tracks an absolute likelihood that the first word is in the speech signal. At step 40 a first background score is estimated based on the first recognition score. The method further provides for calculating a first confidence score at step 42 based on a matching ratio between a first minimum recognition value and a first background score. The first confidence score tracks a noise-corrected likelihood that the first word is in the speech signal. It is preferred that the background score is estimated by averaging the first recognition score over a predetermined period of time. For example, the interval over which the average is calculated might be defined as a specific number of immediately preceding frames, or starting from the beginning of the speech signal.

Turning now to FIG. 5, the preferred approach to calculating the first confidence score is shown in greater detail. Specifically, it can be seen that at step 44 the first minimum recognition value is divided by an average value for the first recognition score such that the matching ratio results. As already discussed, the average value defines the first background score. At step 46 the matching ratio is normalized, where the normalized matching ratio defines the first confidence score. As already noted, the steps shown in FIGS. 4 and 5 can be executed for any number of words contained in the lexicon.

With continuing reference to FIGS. 4 and 5, it will be appreciated that when a second word is spotted in the speech signal, the method 36 is followed as described above. Thus, at step 38 a second recognition score is generated based on the speech signal and a lexicon entry for a second word. The second recognition score tracks an absolute likelihood that the second word is in the speech signal. At step 40 a second background score is estimated based on the second recognition score. A second confidence score is calculated at step 42 based on a matching ratio between a second minimum recognition value and the second background score. The second confidence score tracks a noise-corrected likelihood that the second word is in the speech signal.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed:

1. A method for spotting words in a speech signal, the method comprising the steps of:
   generating a first recognition score based on the speech signal and a lexicon entry for a first word, the first recognition score tracking an absolute value of log likelihood that the first word is in the speech signal;
   estimating a first background score based on the first recognition score;
   calculating a first confidence score based on a matching ratio between a first minimum recognition value of the first recognition score and the first background score, the first confidence score tracking a noise-corrected likelihood that the first word is in the speech signal;

dividing the first minimum recognition value by an average value for the first recognition score over a predetermined period of time such that the matching ratio results, the average value defining the first background score; and normalizing the matching ratio;

said normalized matching ratio defining the first confidence score.

2. The method of claim 1 further including the step of locating a minimum value within the first recognition score.

3. The method of claim 2 further including the step of searching a predetermined range of the first recognition score for the minimum value such that local minimums are excluded from the matching ratio calculation.

4. The method of claim 1 further including the step of comparing the first confidence score to a predetermined confidence threshold, the first word being in the speech signal when the first confidence score exceeds the predetermined confidence threshold.

5. The method of claim 4 further including the step of spotting a second word in the speech signal.

6. The method of claim 5 further including the steps of:

generating a second recognition score based on the speech signal and a lexicon entry for a second word, the second recognition score tracking an absolute value of log likelihood that the second word is in the speech signal;

estimating a second background score based on the second recognition score; and calculating a second confidence score based on a matching ratio between a second minimum recognition value and the second background score, the second confidence score tracking a noise-corrected likelihood that the second word is in the speech signal.

7. The method of claim 6 further including the step of comparing the second confidence score to the predetermined confidence threshold, the second word being in the speech signal when the second confidence score exceeds the predetermined confidence threshold.

8. The method of claim 7 further including the steps of:

determining whether the first word and the second word correspond to a common time period within the speech signal; and selecting between the first word and the second word based on the first confidence score and the second confidence score when the first word and the second word correspond to the common time period.

9. The method of claim 1 further including the step of calculating the confidence score on a frame-by-frame basis.

10. A method for calculating a word spotting confidence score for a given word, the method comprising the steps of:

dividing a minimum value of a speech recognition score by an average value of the speech recognition score over a predetermined period of time such that a matching ratio results, the average value defining an estimated background score; and normalizing the matching ratio;

said normalized matching ratio defining the confidence score.

11. The method of claim 10 further including the step of locating the minimum value within the speech recognition score.

12. The method of claim 11 further including the step of searching a predetermined range of the recognition score for the minimum value such that local minimums are excluded from the matching ratio calculation.

13. A word spotting system comprising:

a speech recognizer for generating recognition scores based on a speech signal and lexicon entries for a plurality of words, the recognition scores tracking absolute values of log likelihoods that the words are in the speech signal; and a spotting module for estimating background scores based on the recognition scores;

said spotting module calculating confidence scores on a frame-by-frame basis based on matching ratios between minimum recognition values of the recognition scores and corresponding background scores, the confidence scores tracking noise-corrected likelihoods that the words are in the speech signal, wherein the spotting module includes:

a confidence module for dividing the minimum recognition values by average values for the recognition scores such that the matching ratios result, the average values defining the background scores;

said confidence module normalizing the matching ratios such that the normalized matching ratios define the confidence scores.

* * * * *

UNITED STATES PATENT AND TRADEMARK OFFICE
CERTIFICATE OF CORRECTION

PATENT NO. : 6,985,859 B2 Page 1 of 1
DATED : January 10, 2006
INVENTOR(S) : Philippe Morin It is certified that error appears in the above-identified patent and that said Letters Patent is hereby corrected as shown below:

Drawings,
Sheet 5, Fig. 6, the defined area of "$\Delta t$" should be the distance between point 52 and point $M_1$.

Signed and Sealed this

Thirteenth Day of June, 2006

JON W. DUDAS
*Director of the United States Patent and Trademark Office*